Oct. 11, 1949.  R. ISAY  2,484,228
CORN SHELLING MACHINE WITH ADJUSTABLE CONCAVE
Filed May 4, 1945
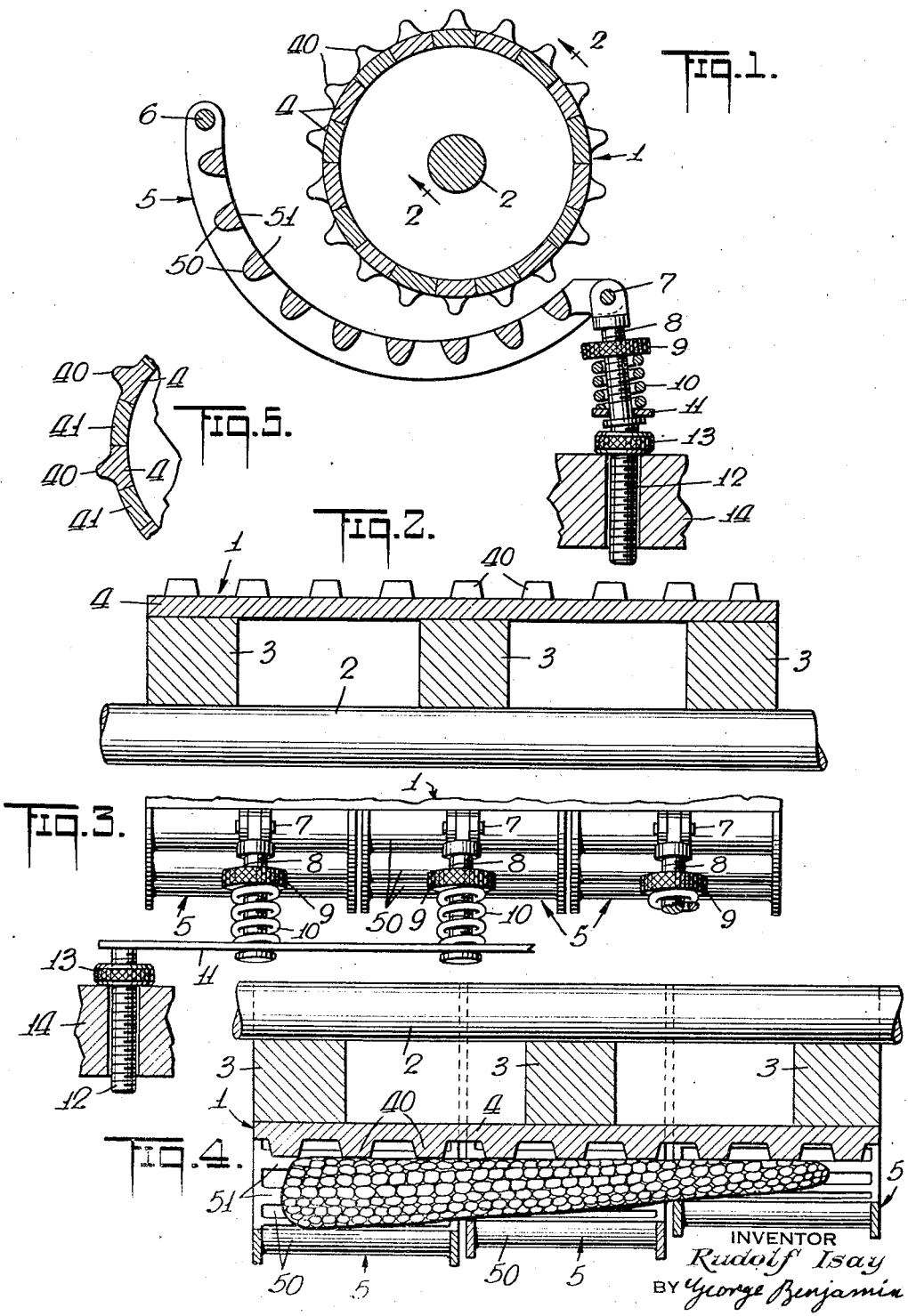
INVENTOR
Rudolf Isay
BY George Benjamin
ATTORNEY Patented Oct. 11, 1949

2,484,228

UNITED STATES PATENT OFFICE 2,484,228

CORN SHELLING MACHINE WITH ADJUSTABLE CONCAVE

Rudolf Isay, Caviana, Brazil

Application May 4, 1945, Serial No. 591,871
In Brazil December 13, 1943

Section 1, Public Law 690, August 8, 1946
Patent expires December 13, 1963

2 Claims. (Cl. 130—6)

The object of the invention is an improvement in corn shelling machines of the type using a toothed cylinder rotatable around a substantially horizontal axis and surrounded on at least part of its lower half by a slotted basket the distance of the exit end of which from said cylinder is adjustable by swinging said end around a second axis which is substantially parallel to said first mentioned axis.

It is an objective of the invention to so improve such a machine that one man is enabled, without undue fatigue, to shell corn in the shuck in the field by driving the machine with his arm by means of a crank or the like.

It is a further objective of the invention to so improve such a machine that, in spite of the widely differing tenacity with which the grains of corn are held in the parts of the ear of different radii, the ear is shelled uniformly throughout without undue damage to the corn grains.

Further objectives and advantages will become apparent from the following specification in connection with the accompanying drawing.

In this drawing is:

Figure 1 a radial section through part of the machine,

Figure 2 a longitudinal section through the upper half of the toothed cylinder,

Figure 3 a longitudinal elevation of part of the machine, partly in section,

Figure 4 a longitudinal section through the lower part of the machine with a corn ear in shelling position, Figure 5 a radial section through part of a modified toothed cylinder.

The cylinder 1 is rotatable on or with the shaft or axle 2 by means of a hand crank with flywheel (not shown), or other simple drive for muscular power. The cylinder consists of three ex-circular supporting discs 3 and staves or bars 4 surrounding them and secured thereto by screws or other means (not shown). These staves or bars are provided with teeth 40 the front and back profiles of which are substantially equal, as shown in Figure 1. Thereby it is made possible, after the front profiles are worn out, to put the back profiles to work by simply reversing the staves on the discs.

The basket consists of three equal sections 5 suspended from and swingable separately and independently around the axle or shaft 6, which is substantially parallel to and at substantially the same level as the axle 2. Linked to each section of the basket by a pin 7 (Figures 1 and 3) is a bolt 8 bearing a nut 9, against which a coil spring 10, guided by the bolt, abuts.

The bolts 8 are slidable within holes of an abutment plate or bar 11 extending throughout the length of the machine. This plate is held at both ends by screw bolts 12 having nuts 13 and passing through holes in the e. g. wooden frame 14 of the machine.

Since the different species of maize or corn produce ears of different size and the size of the ears varies in accordance with the quality of the soil, the fertilizers applied, and the meteorological conditions prevailing, it is necessary to adjust the distance between the cylinder and the basket in accordance with the ears to be shelled.

This adjustment is done by lifting or lowering the plate 11 by means of the bolts 12 and nuts 13. Thereby all the three sections of the basket 5 are swung in unison around the axle 6.

There is, however, a second and very important adjustment in the new machine.

The thinner ends of the conical corn ears hold the grains much more tenaciously than the thicker parts.

In machines in which the basket is made from a single piece the distance between basket and cylinder is determined by the thickest part of the ears and the cobs, and it is this part which is submitted to the strongest pressure. But, unfortunately, as stated above, the points of the cobs hold the grains much more firmly than the waists of the cobs. This is why most cornshellers do not succeed in cleaning the points of the cobs completely. A great number of cobs are expelled from the machine with many grains still sticking to their points. If, however, the basket is made from three separate parts, as is the case with the new machine, each part moving independently, the ears and the cobs are pressed on their whole length against the cylinder, the points being submitted to the same pressure as the waists of the cobs. It is even possible to adjust the three springs differently, thus exercising more pressure on the points of the ears than on their waists.

This is demonstrated in Figure 4 showing a corn ear 80 in shelling position.

By combining the two just described adjustments all possible requirements can be met.

With the exception of the particular advantageous features described the operation of the new machine is as customary in similar machines. The corn ears are charged into the machine between the cylinder 1 and the axle 6 parallel to the latter. By the teeth 40 in cooperation with the slotted basket 5 the ear is thrashed and rolled along the basket 5 to the other end of the basket where the cobs are discharged.

The grains are separated from the husk etc. by hand or mechanical means.

The slotted basket 5 consists of bars 50. The surface 51 of these bars (Figure 1) forming the inner surface of the basket are flat and tangential to said surface. This has been found of great importance in order to obtain a high output without damage being done to the grains.

The modification of the toothed cylinder shown in Figure 5 has alternatively toothed staves 4 and untoothed staves 41. After removal of the toothed staves the machine can be used for thrashing cereals, beans etc., the straw of which would get entangled in the teeth.

Although the new machine has very great advantages for hand operation, large size power operated machines may be built. In such larger machines the grains are separated from the husks etc., by sieves, fans and the like.

It has been found in actual use in Brazil that the new machine, while increasing the production, lowers the cost of manual shelling to 40% of the usual cost and permits to shell the greater part of the corn crop right on the fields, whereas before 75% or even more had to be transported to the barns unshelled, since there was not sufficient time for shelling on the fields, under the old method.

What I claim is:

1. A corn shelling machine comprising, in combination, only two shelling members, viz. a rotatable toothed cylinder with a surface concentric to its axis and a slotted basket arranged eccentric to said cylinder, surrounding the greater part of the lower half thereof but terminating substantially below said axis and formed by a plurality of bars arranged in distance from each other, the inner surface of said basket being formed by flat surfaces of said bars tangential to said inner surface, a stationary axle serving as a support and fulcrum for one longitudinal end edge of said basket, and yielding means adapted to urge the other longitudinal end edge of said basket towards said toothed cylinder, said axle being located substantially at the level of the axis of said cylinder and said yielding means being arranged below said basket and substantially vertical and tangential to said cylinder.

2. A corn shelling machine comprising, in combination, only two shelling members, viz. a rotatable toothed cylinder with a surface concentric to its axis and a slotted basket arranged eccentric to said cylinder, surrounding the greater part of the lower half thereof but terminating substantially below said axis, and formed by a plurality of bars arranged in distance from each other, the inner surface of said basket being formed by flat surfaces of said bars tangential to said inner surface, a stationary axle serving as a support and fulcrum for one longitudinal end edge of said basket, and yielding means adapted to urge the other longitudinal end edge of said basket towards said toothed cylinder, said cylinder being composed of individual staves abutting against one another and alternately provided with teeth and no teeth.

RUDOLF ISAY.

REFERENCES CITED

The following references are of record in the file of this patent:

UNITED STATES PATENTS

| Number | Name | Date |
| --- | --- | --- |
| 287,718 | Prichard | Oct. 30, 1883 |
| 379,603 | Poucher | Mar. 20, 1888 |
| 634,796 | Beale | Oct. 10, 1899 |
| 1,650,988 | Jordan et al. | Nov. 29, 1927 |
| 1,821,316 | Oakes | Sept. 1, 1931 |